US008245069B2

(12) United States Patent
Farmer et al.

(10) Patent No.: US 8,245,069 B2
(45) Date of Patent: Aug. 14, 2012

(54) MULTIPLE POWER SUPPLIES PROVIDING ENHANCED POWER EFFICIENCY

(75) Inventors: Markesha L. Farmer, Durham, NC (US); William J. Piazza, Holly Springs, NC (US); Nancy A. Schipon, Apex, NC (US); Edward S. Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/558,730

(22) Filed: Sep. 14, 2009

(65) Prior Publication Data

US 2011/0066871 A1    Mar. 17, 2011

(51) Int. Cl.
*G06F 1/00* (2006.01)
*G06F 1/26* (2006.01)
*G06F 1/32* (2006.01)
*G06F 11/30* (2006.01)

(52) U.S. Cl. .................. 713/340; 713/300; 713/320

(58) Field of Classification Search .................. 713/300, 713/320, 324, 340
See application file for complete search history.

(56) References Cited

U.S. PATENT DOCUMENTS

| | | | |
|---|---|---|---|
| 5,428,524 A | 6/1995 | Massie | |
| 6,381,155 B1 | 4/2002 | Kadatsky et al. | |
| 6,522,190 B1 | 2/2003 | Malik et al. | |
| 6,940,736 B2 | 9/2005 | Jonsson | |
| 6,995,548 B2 | 2/2006 | Walters et al. | |
| 7,030,512 B2 | 4/2006 | Krein | |
| 7,400,062 B2 | 7/2008 | Pincu et al. | |
| 7,523,321 B2 | 4/2009 | Nikazm et al. | |
| 2003/0009702 A1* | 1/2003 | Park ............................ | 713/300 |
| 2005/0028017 A1* | 2/2005 | Janakiraman et al. ........ | 713/340 |
| 2009/0217060 A1* | 8/2009 | Tsuchiya ....................... | 713/300 |
| 2009/0254768 A1* | 10/2009 | Livescu et al. ................ | 713/320 |
| 2009/0271642 A1* | 10/2009 | Cheng et al. .................. | 713/300 |
| 2010/0011227 A1 | 1/2010 | Govindan et al. | |
| 2010/0088533 A1 | 4/2010 | Benhase et al. | |

FOREIGN PATENT DOCUMENTS

JP    2008083841 A    4/2008

OTHER PUBLICATIONS

NEC Copuutertechno Ltd. "Patent Abstracts of Japan "Blade Server, Blade Device, and Power Management Method for Blade Server" Publication No. JP2008-08384 (English translation)", Apr. 10, 2008, pp. 1-18.
IBM Authors et al "Share the Backup Power Module in a Rack", IP.com PriorArtDatabase, Mar. 6, 2009, 9 pages.
IBM Authors et al "Changing Power Supply Loading to Maximize Total System Power Supply Efficiency", IP.com, PriorArtDatabase, Mar. 18, 2008, 3 pages.

* cited by examiner

*Primary Examiner* — Thomas Lee
*Assistant Examiner* — Samantha Hoang
(74) *Attorney, Agent, or Firm* — Cynthia G. Seal; Jeffrey L. Streets

(57) ABSTRACT

Method and computer program product for supplying power in a computing system, and computer program product implementing the method. The method comprises monitoring power consumption of the computing system, supplying power to the computing system using only a first power supply over a first range of power consumption, and supplying power to the computing system using a combination of the first power supply and a second power supply over a second range of power consumption. The first power supply provides greater efficiency than the combination of the first and second power supplies over the first lower range of power consumption, the combination of the first and second power supplies provides greater efficiency than the first power supply over the second higher range of power consumption.

18 Claims, 5 Drawing Sheets

MULTIPLE POWER SUPPLIES PROVIDING ENHANCED POWER EFFICIENCY

BACKGROUND OF THE INVENTION

1. Field of the Invention

The present invention relates to supplying power to a computer system, and more specifically to methods of improving the power efficiency of a computer system.

2. Background of the Related Art

The amount of power consumed by the equipment in a modern datacenters represents a significant expense, even in relation to the cost of the equipment itself. A modern datacenter may include as many as tens of hundreds of high-power, rack-mounted servers disposed in high-density enclosures. Management of the power consumed by this equipment is an important consideration in the design and operation of any datacenter.

Attempts to optimize power consumption may be multifaceted. For example, power consumption may be reduced by improving datacenter layout and component selection. Furthermore, the design of individual components can affect the overall efficiency of a server or other device. Power management solutions may include both hardware and software aspects aimed at improving various aspects of power utilization, allocation, and load scheduling.

BRIEF SUMMARY OF THE INVENTION

One embodiment of the present invention provides a method for supplying power in a computing system. The method comprises monitoring power consumption of the computing system, supplying power to the computing system using only a first power supply over a first range of power consumption, and supplying power to the computing system using a combination of the first power supply and a second power supply over a second range of power consumption. The first power supply provides greater efficiency than the combination of the first and second power supplies over the first lower range of power consumption, and the combination of the first and second power supplies provides greater efficiency than the first power supply over the second higher range of power consumption. In this embodiment, until this optimal power consumption is reached (i.e., until the first range of power consumption has been exceeded), the second power supply remains completely off, not requiring even stand-by power.

Another embodiment of the invention provides a computer program product including computer usable program code embodied on a computer usable storage medium for managing the supply of power in a computer system. The computer program product is preferably executed by a management entity, and comprises computer usable program code for monitoring power consumption of the computing system, computer usable program code for instructing only a first power supply to supply power to the computing system over a first range of power consumption, and computer usable program code for instructing a combination of the first power supply and a second power supply to supply power to the computing system over a second range of power consumption. As with the foregoing method, the first power supply provides greater efficiency than the combination of the first and second power supplies over the first lower range of power consumption, the combination of the first and second power supplies provides greater efficiency than the first power supply over the second higher range of power consumption.

DETAILED DESCRIPTION OF THE INVENTION

Figure 1:
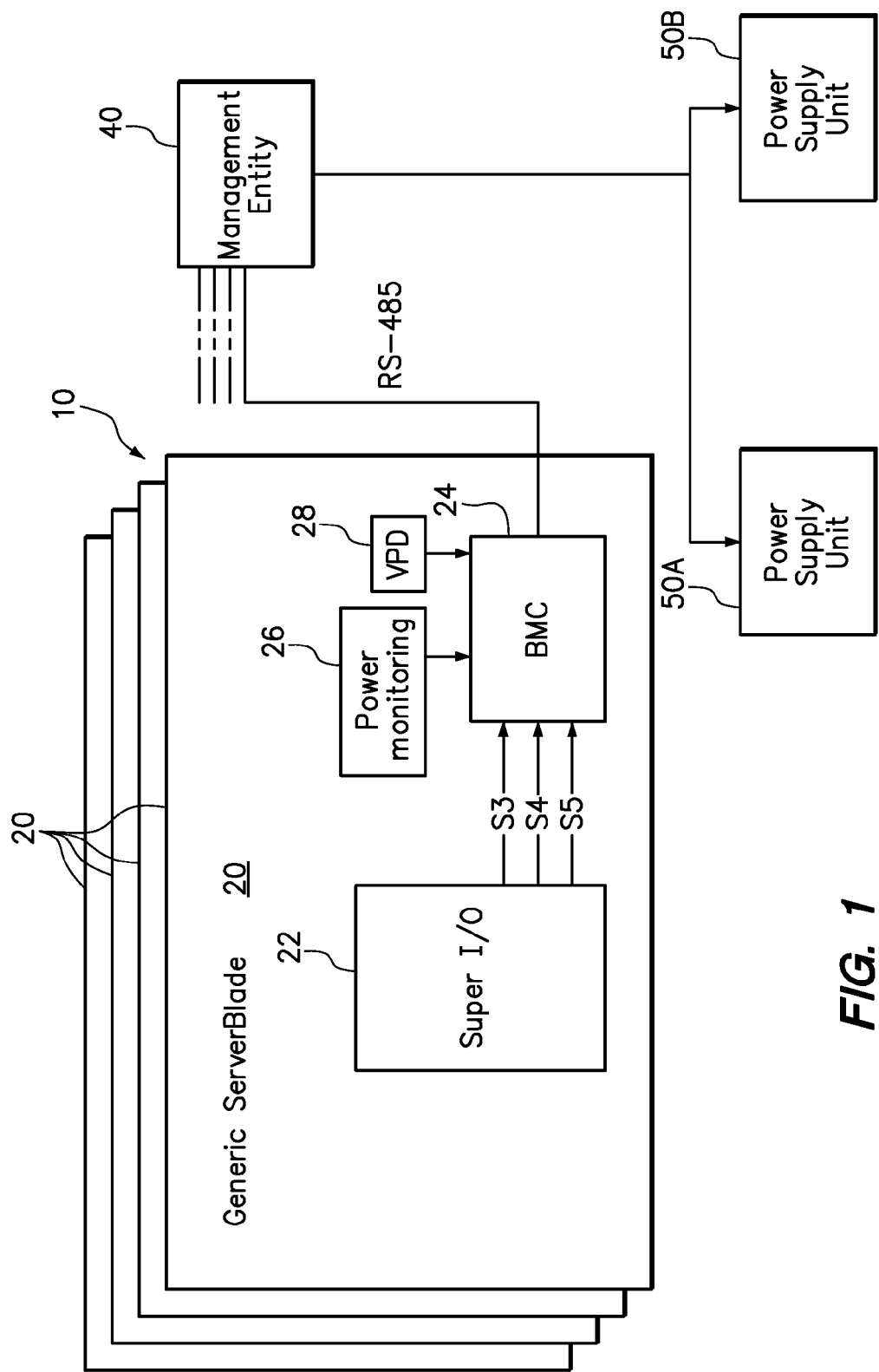
FIG. 1 is a block diagram of a single server blade of a computer system that is being monitored by a management entity in order to efficiently supply power to the computer system.

One embodiment of the present invention provides a method for supplying power in a computing system, and computer program product implementing the method. The method comprises monitoring power consumption of the computing system, supplying power to the computing system using only a first power supply over a first range of power consumption, and supplying power to the computing system using a combination of the first power supply and a second power supply over a second range of power consumption. The first power supply provides greater efficiency than the combination of the first and second power supplies over the first lower range of power consumption, the combination of the first and second power supplies provides greater efficiency than the first power supply over the second higher range of power consumption. The reason that the power supply efficiency decreases at high power output is because the field effect transistors used in regulating power supply current have a finite resistance (R). The loss in the efficiency of the power consumption is related to the square of the current drawn, e.g. $P_{loss}=I^2$ output times $R_{FET}$. One can see by these equations that reducing the output current at higher current consumptions (higher power outputs) has a significant power savings.

In another embodiment, the method further comprises switching from the first power supply to the combination of the first and second power supplies in response to the power consumption reaching a first power consumption setpoint, and switching from the combination of the first and second power supplies to the first power supply in response to the power consumption reaching a second power consumption setpoint, wherein the first power consumption setpoint is greater than the second power consumption setpoint. The first power consumption setpoint is preferably greater than the power consumption corresponding to the cross-over efficiency between the first power supply and the combination of the first and second power supplies. It is also preferable that the second power consumption setpoint is less than the power consumption corresponding to the cross-over efficiency between the first power supply and the combination of the first and second power supplies. This preferred method provides a hysteresis function to ensure that there is no power supply oscillation near the first power consumption setpoint. Optionally, the first power consumption setpoint, the second power consumption setpoint, or both may have a predetermined value, for example as a result of empirical testing of power supply efficiencies.

In a further embodiment, the computer system includes a plurality of computer servers, and the power consumption is that amount of power consumed by the plurality of computer servers. Preferably, a management entity monitors the power consumption of the computer system by receiving power consumption data from each of the plurality of computer servers. This may be accomplished where each of the plurality of computer servers includes a baseboard management controller that provides server power consumption data to the management entity.

FIG. 1 is a block diagram of a plurality of server blades 20 within a computer system 10 that is being monitored by a management entity 40 in order to efficiently supply power from the power supplies 50A, 50B to the computer system. Each server blade 20 includes a "Super I/O" controller 22 and a baseboard management controller (BMC) 24 which receives power monitoring data 26 from other components (not shown) within the server blade 20 and has access to vital product data (VPD) 28 about the server blade 20 and its components. The BMC 24 communicates with the management entity 40 over a communication line, such as a serial port compatible with the RS-485 standard. Furthermore, the management entity 40 communicates with a voltage regulator controller for each of the power supplies 50A, 50B. These controllers monitor the output power consumption and convert the input power to the power required by the computer system 10. Both of the power supplies are capable of supplying power to the entire computer system. In one embodiment, the power supplies' voltage regulator circuitry uses a Pulse Width Modulation (PWM) scheme and three-phase regulation with output field-effect transistors (FETs).

To better manage power consumption and efficiency, the management entity 40, such as the advanced management module of a BLADECENTER server system (BLADECENTER is a trademark of IBM Corporation in Armonk, N.Y.), can monitor the power consumption of each server 20. The management entity 40 runs software, such as IBM POWEREXECUTIVE (IBM and POWEREXECUTIVE are trademarks of IBM Corporation), that may use the individual blade server power consumption data to determine the total amount of power consumed by the computer system 10. Although FIG. 1 shows the computer system 10 including only server blades 20, the computer system may be defined to include the management entity 40 or any number of other system components, such as an entire rack of servers.

When the management entity 40 determines that the computer system 10 has crossed a power consumption setpoint that corresponds with the cross-over efficiency, then the management entity 40 can bring an additional alternating current to direct current (AC/DC) power supply 50 on line. Accordingly, the computer system 10 is supplied with power from only one power supply 50 over a first range of power consumption that is less than the power consumption setpoint and is supplied with power from synchronous operation of a combination of power supplies over a second range of power consumption that is greater than the power consumption setpoint. This method of supplying power to the computer system 10 combines the greater efficiency of a single heavily loaded power supply over the first (lower) range of power consumption with the greater efficiency of multiple synchronous power supplies over a second (higher) range of power consumption.

While the present disclosure provides a detailed discussion of using two power supplies, it should be understood that the invention may also be applied to the use of any number of multiple power supplies, such that there is a cross-over efficiency between each successively larger grouping of power supplies (i.e., 1, 2, 3, 4, . . . ). However, there is a tradeoff between the greater power efficiencies that multiple power supplies can provide in accordance with the invention, and the greater initial cost of purchasing multiple power supplies.

In one embodiment of the invention, the baseboard management controller (BMC) reads the Vital Product Data (VPD) to determine the power requirements for each server blade. This information may be communicated to the management entity that is monitoring the power consumption of the computer system. The management entity may have a power consumption table that includes the actual amount of power being consumed by each server, and that power consumption table may also indicate the amount or range of power consumption that is associated with different operational states of the server blades. Therefore, when a server blade is to be turned on, this table may be used to determine whether the one or more currently active power supplies can provide enough power to allow the server to be powered on. In addition, the BMC may continuously monitor the actual power consumption of each server blade and continuously update the power consumption table. For example, should a server blade go into a sleep state, the BMC for that server blade will communicate this information to the management entity. Because the management entity is notified of the change in the power state prior to the server blade actually entering that state, the management can provide a proactive power management function to more closely manage power efficiency. The same statement can be made when the blade server exits the sleep state. Since the management entity is notified of the change in state, the management entity can proactively determine if a second power supply should be brought on line immediately. Otherwise, the management entity operates in a reactionary mode.

As server blades are added to the configuration, more power is required. Such a change in the power consumption of the computer system causes a change in the efficiency of the one or more power supply that is turned on. Each power supply is least efficient at its lowest power output and also has a lower efficiency at full (100%) power output. Ideally, maximum power efficiency is achieved when the power supply is operating at approximately 85% of the maximum power rating. When a computer system requires additional power, an additional power supply can be brought on line to work in combination with a first power supply in order to minimize the reduced power efficiencies associated with low power and full power operation of power supplies. As additional power supplies are brought on line, they are brought online before the operational power supply(ies) reach full power and share the load so that none of the power supplies operate at very low power.

When the power consumption passes the cross-over efficiency, the management entity initializes the second power supply to begin regulation. In one embodiment, the management entity sends a command to the operating power supply to indicate a change of state and a separate command to the second power supply to indicate its operational state. Preferably, an interlock protocol is used to ensure both power supplies have received the appropriate command, before the management entity issues a synchronization pulse to both power supplies instructing the power supplies to change their phase regulation to the state indicated in the command. An example of one method of phase regulation is described in greater detail with regard to FIG. 3.

Figure 2:
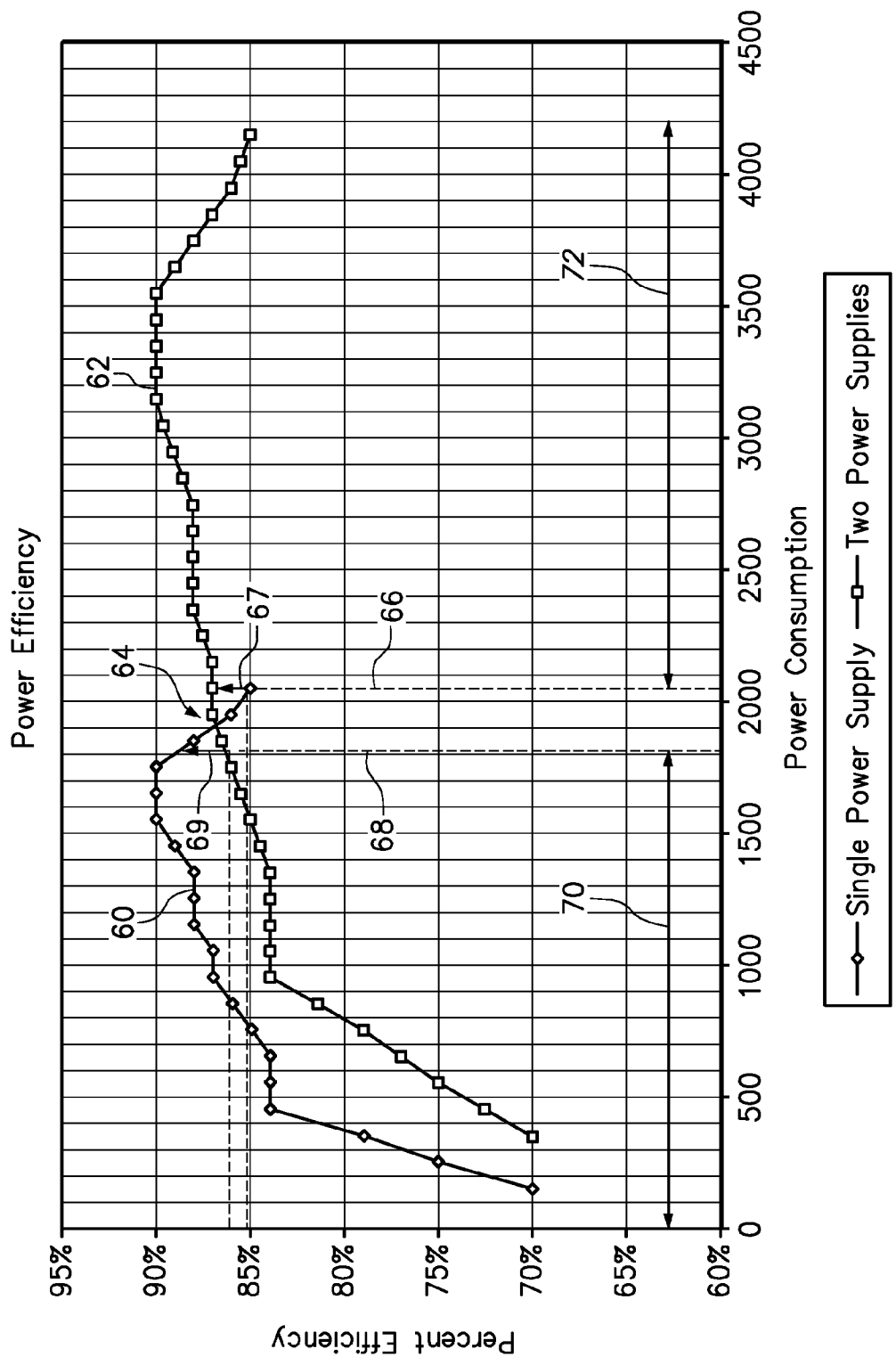
FIG. 2 is a graph of power efficiency as a function of power consumption including a power efficiency curve for a single power supply and a power efficiency curve for a combination of two synchronous power supplies.

FIG. 2 is a graph of power efficiency (along the y-axis) as a function of power consumption (along the x-axis) including a first power efficiency curve 60 for a single power supply and a second power efficiency curve 62 for a combination of the first power supply operating synchronously with a second power supply that is identical to the first power supply. In the example of FIG. 2, each of the two power supplies has a nominal power rating of 2000 Watts. Every 1% increase in power efficiency at 1000 Watts of total power consumption saves 10 Watts, and at 2000 Watts of total power consumption saves 20 Watts. As the total power consumption of the computer system increases, an increase in power efficiency provides ever greater power savings.

In reference to the first power efficiency curve 60 for a single power supply, it may be noted that the efficiency of the power output begins to decline at about 85% of the rated maximum power output. The power efficiency profile for a given power supply is a characteristic of the power supply design and may be predetermined and stored in either the BMC or the management entity. Alternatively, the power supply could be designed to measure its own power efficiency and report that to the management entity.

As illustrated by the first power efficiency curve 60, power supplies generally exhibit a similar decline at about 85% of the rated maximum power output. Accordingly, the AC to DC power conversion efficiency of the power supply is generally better at 40% to 50% of the rated output of the power supply (i.e., about 87% efficiency) than at 90% of the rated maximum (i.e., about 86% efficiency). As a result, when the computer system is consuming more power than about 90% of the rated maximum of a single power supply, the power efficiency can be increased (or a reduction in power efficiency may be avoided) by activating a second power supply and operating two power supplies to share the load rather than have only one power supply continue to carry the load.

The point where the first power efficiency curve 60 for a single power supply intersects the second power efficiency curve 62 is referred to as the cross-over efficiency 64. In FIG. 2, the cross-over efficiency is about 87% and occurs at a power consumption of about 1900 Watts. Although it would be ideal to activate the second power supply to work in combination with the first power supply immediately upon the power consumption reaching the cross-over efficiency (here, shown at 1900 Watts), there is a possibility that small fluctuations in the power consumption would cause excessive switching back and forth between one power supply and two power supplies. This potential for excessive switching is avoided in one embodiment of the invention by implementing a first power consumption setpoint 66 (shown at about 2050 Watts) that will trigger switching from the first power supply to the combination of the first and second power supplies (see arrow 67 illustrating the switch), and implementing a second power consumption setpoint 68 (shown at about 1800 Watts) that will trigger switching from the combination of the first and second power supplies to the first power supply (see arrow 69 illustrating the switch). Providing some separation in the values of the setpoints 66, 68 prevents excessive switching. As shown, a 250 Watt change in power consumption is necessary to cause switching. In other words, after switching from one power supply to two at 2050 W, the management entity would not switch back to only one power supply unless the power consumption had decreased to 1800 W. Similarly, after switching from two power supplies to one at 1800 W, the management entity would not switch back to two power supplies unless the power consumption had increased to 2050 W.

Other values of the setpoints and the amount of separation between the setpoints are within the scope of the invention. Still, it is preferable that the first power consumption setpoint 66 is greater than the power consumption at the cross-over efficiency 64 and preferable that the second power consumption setpoint 68 is less than the power consumption at the cross-over efficiency 64 so that the switch always results in an increase in the power efficiency (i.e., the arrows 67, 69 point upward). However, this preference is not a requirement, but a practical way of switching the number of active power supplies to improve the overall power efficiency. Both setpoints could be greater than the power consumption at the cross-over efficiency or both setpoints could be less than the power consumption at the cross-over efficiency.

It should also be noted that the setpoints have been described in terms of a power consumption value, but the relationship between power consumption and power efficiency means that the setpoints could also be stated in terms of a power efficiency value. Since the invention is directed at improving the efficiency of the power being supplied to the computer system, the power efficiency is perhaps the more relevant variable to control. However, some additional logic might be required to avoid switching at inappropriate times since even a single power supply curve may hit a given power efficiency value more than once. For example the single power supply curve 60 passes through an 85% efficiency at both 750 W output and 2050 W output. Switching from one power supply to two at 750 W would actually cause a significant reduction in power efficiency. Furthermore, the individual components of the computer system, such as server blades, already report power consumption to the management entity 40, so it may be more convenient and practical to switch the number of power supplies that are active on the basis of power consumption setpoints.

The foregoing methods for switching between the number of power supplies allows power to be supplied to the computing system using only a first power supply over a first range of power consumption 70, and allows power to be supplied to the computing system using a combination of the first power supply and a second power supply over a second range of power consumption 72. Near the cross-over efficiency 64, the efficiency of the first power supply is comparable to the efficiency of the combination of power supplies. Although the gap between the first range 70 and the second range 72 is preferably kept narrow, optionally less than 250 W or less than 150 W, the methods of the present invention may utilize either the first power supply or the combination of power supplies in the gap.

Figure 3A:
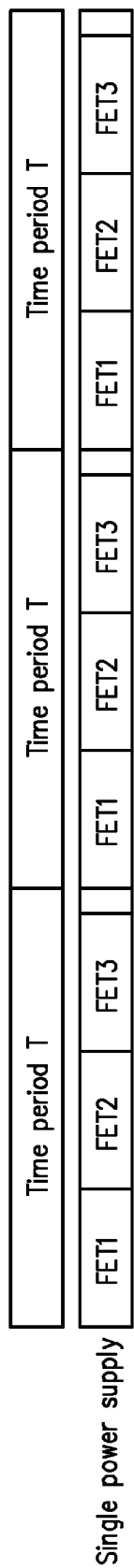
FIG. 3A is a diagram showing supply of power to a computer system using a single power supply.
Figure 3B:
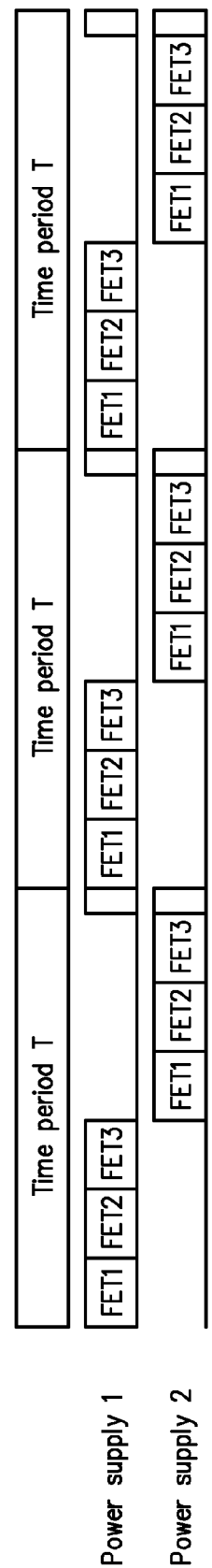
FIG. 3B is a diagram showing supply of power to a computer system using a combination of power supplies operating synchronously.

FIG. 3A is a diagram illustrating power being supplied to a computer system using a single power supply and FIG. 3B is a diagram illustrating power being supplied to the computer system using a combination of power supplies operating synchronously. In FIG. 3A, a first timeline (series of time periods T) illustrates the use of only one power supply using three-phase regulation. Each of three field-effect transistors (FETs) is active for 30% of the duty cycle to get a total of 90% of the rated output of the power supply. In FIG. 3B, a second timeline illustrates the use of two power supplies that each use three-phase regulation, but the FETs of the two power supplies are synchronized in time. Actually, each of the six FETs in the second timeline (three FETs in each of the two power supplies) operate synchronously and are active for 15% of the duty cycle to provide the same amount of power as the single power supply in FIG. 3A. Accordingly, both of the two power supplies operate at 45% of their rated capacity (i.e., 3 FETs at 15% each), resulting in an increase in the total overall power efficiency.

Figure 4:
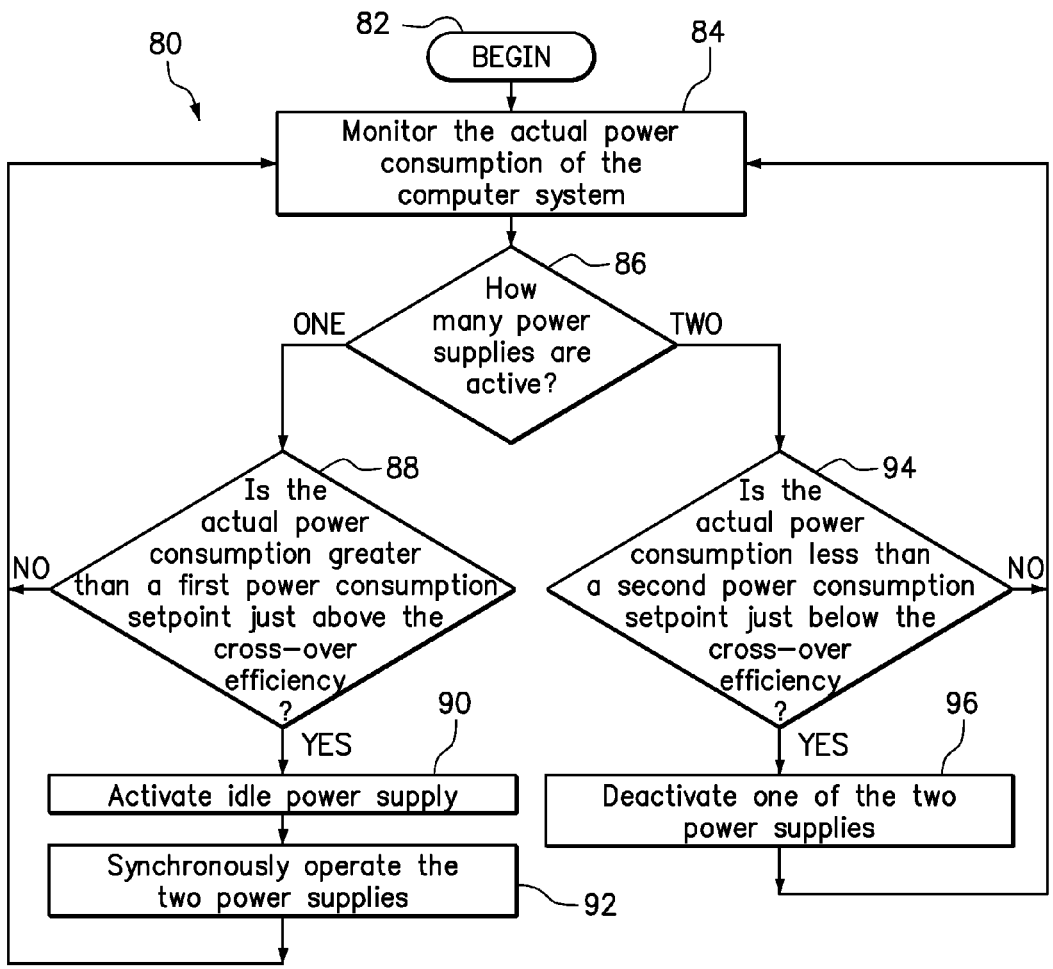
FIG. 4 is a flowchart of a method of supplying power to a computer system.

FIG. 4 is a flowchart of a method 80 of supplying power to a computer system. The method begins at step 82 and begins monitoring the actual power consumption of the computer system in step 84. If step 86 determines that there is only one active power supply, then the method branches to step 88. If step 88 determines that the actual power consumption of the computer system is not greater than a first power consumption setpoint, then no action is taken and the method returns to step 84. However, if step 88 determines that the actual power consumption is greater than the first power consumption setpoint just above the cross-over efficiency, then an idle power supply is activated in step 90 and the two power supplies are operated synchronously in step 92 before returning to step 84.

If step 86 determines that there are two active power supplies, then the method proceeds to step 94 whether the actual power consumption is less than a second power consumption setpoint just below the cross-over efficiency. If not, the method returns to step 84 without taking any action. However, if step 94 determines that the actual power consumption is less than the second setpoint, then one of the two power supplies is deactivated in step 96 leaving one power supply to operate on its own. The method then returns to step 84.

Figure 5:
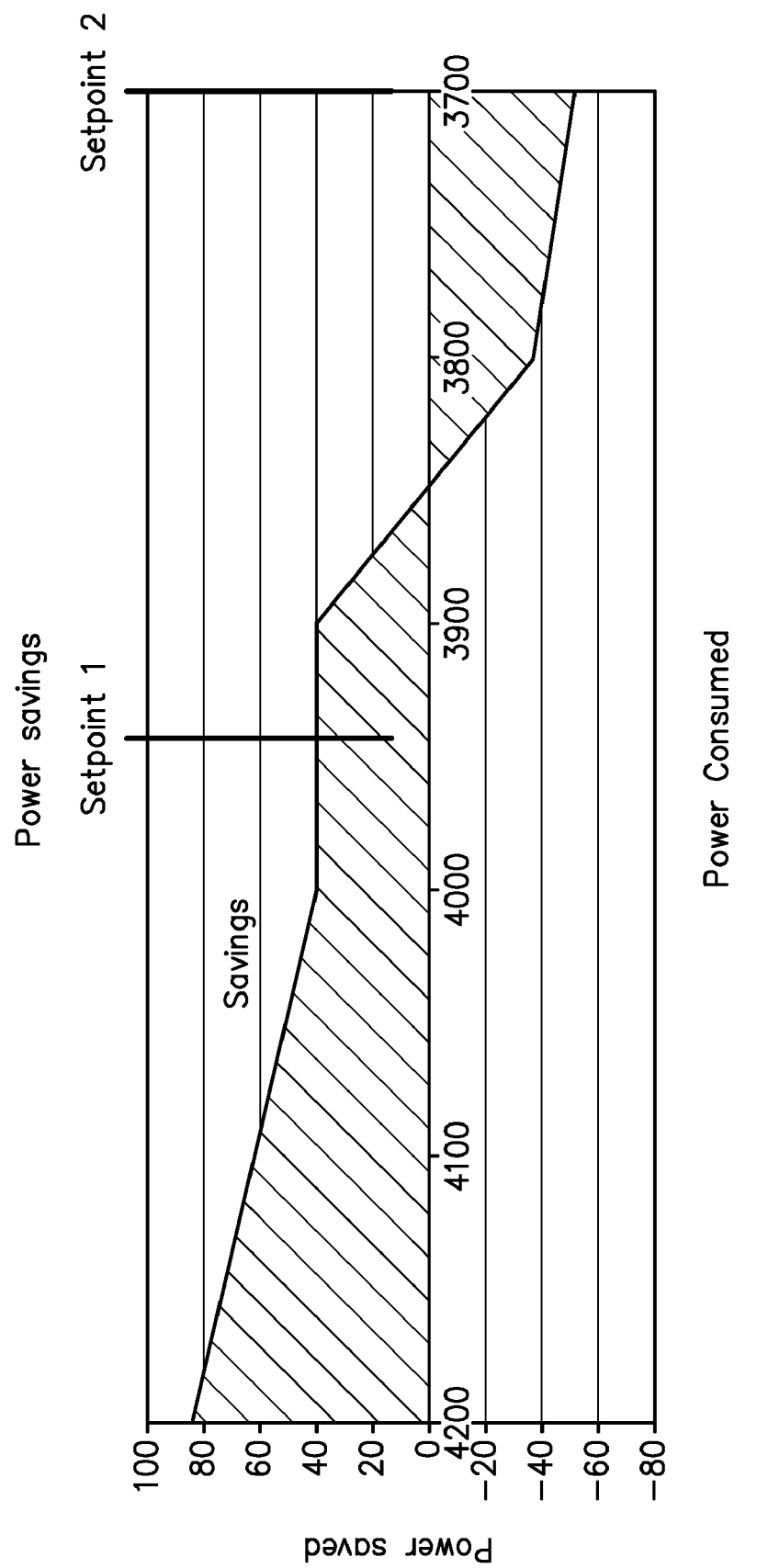
FIG. 5 is a graph of power savings as a function of power consumed in a range near the cross-over in FIG. 2.

FIG. 5 is a graph of power savings as a function of power consumed in a range near the cross-over in FIG. 2. The graph shows that operating two power supplies in accordance with present invention results in significant power savings over a broad range of operation. It should be noted that providing separate first and second power consumption setpoints has been disclosed to avoid unnecessary oscillation between one and two active power supplies, but this may also lead to a minor region of negative power savings. This is true where the setpoint does not trigger activation of the most efficient number of power supplies until the actual power consumption has already passed the cross-over efficiency. Depending upon the setpoint selection a minor region of negative power savings may occur as power consumption rises above the cross-over efficiency, as power consumption falls below the cross-over efficiency, or both. Furthermore, the setpoints and/or the range between the setpoint may be increased or decreased in order to reduce or eliminate "negative power savings."

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible storage medium having computer-usable program code stored on the storage medium.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for supplying power in a computing system, comprising:
   monitoring power consumption of the computing system;
   supplying power to the computing system using only a first power supply over a first range of power consumption; and
   supplying power to the computing system using a combination of the first power supply and a second power supply over a second range of power consumption;
   wherein the first range is lower than the second range, wherein the first power supply provides greater efficiency than the combination of the first and second power supplies over the first range of power consumption, and wherein the combination of the first and second power supplies provides greater efficiency than the first power supply over the second range of power consumption; and
   switching from the first power supply to the combination of the first and second power supplies in response to the power consumption increasing to a first power consumption setpoint; and
   switching from the combination of the first and second power supplies to the first power supply in response to the power consumption decreasing to a second power consumption setpoint, wherein the first power consumption setpoint is greater than the second power consumption setpoint.

2. The method of claim 1, wherein the combination of the first and second power supplies operate in a synchronous mode.

3. The method of claim 1, wherein the first power consumption setpoint is greater than the power consumption corresponding to the cross-over efficiency between the first power supply and the combination of the first and second power supplies.

4. The method of claim 3, wherein the second power consumption setpoint is less than the power consumption corresponding to the cross-over efficiency between the first power supply and the combination of the first and second power supplies.

5. The method of claim 4, wherein the first and second power consumption setpoints are no more than 150 Watts from the power consumption at the cross-over efficiency.

6. The method of claim 1, wherein the computer system includes a plurality of computer servers, and wherein the power consumption is that amount of power consumed by the plurality of computer servers.

7. The method of claim 6, wherein the step of monitoring the power consumption of the computer system includes a management entity receiving power consumption data from each of the plurality of computer servers.

8. The method of claim 7, wherein each of the plurality of computer servers includes a baseboard management controller that provides server power consumption data to the management entity.

9. The method of claim 1, further comprising:
   changing the number of computer servers in the computer system.

10. A computer program product including computer usable program code embodied on a non-transitory computer usable storage medium for managing the supply of power in a computer system, the computer program product including:
    computer usable program code for monitoring power consumption of the computing system;
    computer usable program code for instructing only a first power supply to supply power to the computing system over a first range of power consumption; and
    computer usable program code for instructing a combination of the first power supply and a second power supply to supply power to the computing system over a second range of power consumption;
    wherein the first range is lower than the second range, wherein the first power supply provides greater efficiency than the combination of the first and second power supplies over the first range of power consumption, and wherein the combination of the first and second power supplies provides greater efficiency than the first power supply over the second range of power consumption; and
    computer usable program code for switching from the first power supply to the combination of the first and second power supplies in response to the power consumption reaching a first power consumption setpoint; and
    computer usable program code for switching from the combination of the first and second power supplies to the first power supply in response to the power consumption reaching a second power consumption setpoint, wherein the first power consumption setpoint is greater than the second power consumption setpoint.

11. The computer program product of claim 10, wherein the combination of the first and second power supplies operate in a synchronous mode.

12. The computer program product of claim 10, wherein the first power consumption setpoint is greater than the power consumption corresponding to the cross-over efficiency between the first power supply and the combination of the first and second power supplies.

13. The computer program product of claim 12, wherein the second power consumption setpoint is less than the power consumption corresponding to the cross-over efficiency between the first power supply and the combination of the first and second power supplies.

14. The computer program product of claim 13, wherein the first and second power consumption setpoints are no more than 150 Watts from the power consumption at the cross-over efficiency.

15. The computer program product of claim 10, wherein the computer system includes a plurality of computer servers, and wherein the power consumption is that amount of power consumed by the plurality of computer servers.

16. The computer program product of claim 15, wherein the computer usable program code for monitoring the power consumption of the computer system includes computer usable program code for receiving power consumption data from each of the plurality of computer servers.

17. The computer program product of claim 16, wherein each of the plurality of computer servers includes a baseboard management controller that provides server power consumption data to the management entity.

18. The computer program product of claim 10, further comprising:

computer usable program code for detecting a change in the number of computer servers in the computer system.

* * * * *